United States Patent
Hsu (10) Patent No.: US 8,904,601 B2
(45) Date of Patent: Dec. 9, 2014

(54) SYNCHRONOUS MOVEMENT DEVICE APPLIED TO DUAL-SHAFT SYSTEM

(71) Applicant: First Dome Corporation, New Taipei (TW)

(72) Inventor: An Szu Hsu, New Taipei (TW)

(73) Assignee: First Dome Corporation, New Taipei (TW)

( * ) Notice: Subject to any disclaimer, the term of this patent is extended or adjusted under 35 U.S.C. 154(b) by 0 days.

(21) Appl. No.: 13/914,778

(22) Filed: Jun. 11, 2013

(65) Prior Publication Data

US 2014/0251040 A1 Sep. 11, 2014

(30) Foreign Application Priority Data

Mar. 11, 2013 (TW) .............................. 102108559 A (51) Int. Cl.
*E05D 3/06* (2006.01)
*F16H 21/12* (2006.01)

(52) U.S. Cl.
CPC ..................................... *F16H 21/12* (2013.01)
USPC .......................................................... 16/366

(58) Field of Classification Search
USPC ........... 16/366, 368, 371, 365, 302, 312, 313, 16/315, 316, 357, 358; 49/67, 463, 116, 49/104
See application file for complete search history.

(56) References Cited

U.S. PATENT DOCUMENTS

| | | | | |
|---|---|---|---|---|
| 4,242,773 | A * | 1/1981 | Beigh | 16/371 |
| 5,666,694 | A * | 9/1997 | Slow et al. | 16/368 |
| 7,414,834 | B2 * | 8/2008 | Ukonaho et al. | 361/679.55 |
| 7,512,426 | B2 * | 3/2009 | Maatta et al. | 455/575.1 |
| 7,738,930 | B2 * | 6/2010 | Petrella | 455/575.3 |
| 7,765,644 | B2 * | 8/2010 | Ueyama et al. | 16/354 |
| 7,900,323 | B2 * | 3/2011 | Lin | 16/366 |
| 8,474,101 | B2 * | 7/2013 | Wang et al. | 16/366 |
| 8,615,848 | B2 * | 12/2013 | Mitsui | 16/366 |
| 2006/0236505 | A1 * | 10/2006 | Maatta et al. | 16/366 |
| 2006/0238970 | A1 * | 10/2006 | Ukonaho et al. | 361/683 |
| 2008/0307608 | A1 * | 12/2008 | Goto | 16/366 |
| 2009/0000062 | A1 * | 1/2009 | Yamanami | 16/366 |
| 2009/0013500 | A1 * | 1/2009 | Ueyama et al. | 16/354 |
| 2011/0157780 | A1 * | 6/2011 | Wang et al. | 361/679.01 |
| 2011/0289726 | A1 * | 12/2011 | Zhang et al. | 16/250 |
| 2012/0096678 | A1 * | 4/2012 | Zhang et al. | 16/302 |

* cited by examiner

*Primary Examiner* — Jeffrey O Brien
(74) *Attorney, Agent, or Firm* — Rosenberg, Klein & Lee (57) ABSTRACT

A synchronous movement device applied to dual-shaft system includes a first shaft and a second shaft, which are assembled with each other and synchronously rotatable. The synchronous movement device further includes a driver disposed on the first shaft and a reactor disposed on the second shaft and a link unit connected between the driver and the reactor. When the first shaft drives the driver to rotate, the driver pushes the link unit to move along the first and second shafts to forcedly push the reactor to rotate in a direction reverse to the moving direction of the driver. Accordingly, the first and second shafts are synchronously rotated.

16 Claims, 9 Drawing Sheets

SYNCHRONOUS MOVEMENT DEVICE APPLIED TO DUAL-SHAFT SYSTEM

BACKGROUND OF THE INVENTION

1. Field of the Invention

The present invention relates generally to a synchronous movement device applied to dual-shaft system including a first shaft and a second shaft. The synchronous movement device includes a driver disposed on the first shaft and a reactor disposed on the second shaft and a link unit connected between the driver and the reactor. In operation, the driver, the link unit and the reactor serve to transmit force to make the first and second shafts synchronously rotate.

2. Description of the Related Art

There are various electronic apparatuses provided with covers or display screens or viewers, such as mobile phones, notebooks, PDA, digital imagers and electronic books. The covers or display screens or viewers are pivotally mounted on the electronic apparatuses via pivot pins or rotary shafts, whereby the covers or display screens or viewers can be freely rotated and opened/closed under external force.

In order to operate the display module (such as the screen) and/or the apparatus body module of the electronic apparatus in more operation modes and application ranges, a dual-shaft mechanism is provided between the display module and the apparatus body module, whereby the display module and/or the apparatus body module can be operated in different operation modes by different rotational angles.

In the above conventional pivot pin structures or rotary shaft structures, generally multiple gaskets with through holes and recessed/raised locating sections, multiple frictional plates and multiple cooperative springs are assembled on the rotary shaft. Two ends of the rotary shaft are respectively fixed by means of retainer rings or retainer members. The springs serve to store energy and release the energy to achieve the objects of rotating and locating the rotary shaft or pivot pin assembly. Basically, the above structures are relatively complicated and it is hard to assemble the structures. Moreover, after a period of operation, the recessed/raised locating sections of the gaskets or frictional plates are likely to wear. This will affect the locating effect.

There is also a conventional mechanism composed of rollers and drive wires (or transmission belts) for transmitting force to the rotary shaft so as to rotate the rotary shaft. As known by those who are skilled in this field, during the operation process of the wires or the transmission belts, delay of kinetic energy transmission will take place. This is because there is a gap between the wires (or transmission belts) and the rollers and the wires (or transmission belts) will slip or untruly operate. Also, the wires (or transmission belts) are made of elastic material and the fixing structure for assembling the wires (or transmission belts) with the rollers is not ideal. As a result, in force transmission, the load on the wires or the pulling force applied to the wires will increase. In this case, the transmission and shift effect of the wires will be deteriorated and the wires may detach from the rollers. Especially, after a period of use, the force of the wires or transmission belts, which is preset in the assembling process will decrease due to elastic failure. Under such circumstance, the synchronous movement effect of the transmission mechanism will be deteriorated.

In some cases, the wires or transmission belts have serious elastic fatigue and often detach from the rollers during the movement of the slide cover module. Under such circumstance, the rotary shaft device will lose its synchronous displacement effect.

There is another problem existing in the application and manufacturing of the wires or transmission belts. That is, during the assembling process of the wires or transmission belts, the wires or transmission belts need to be tensioned. This will make it more difficult to control the quality of wiring and assembling. Therefore, the ratio of good products can be hardly promoted and the assembling time can be hardly shortened. As a result, the manufacturing cost is increased.

In order to improve the above problems, a conventional dual-shaft synchronous movement device has been developed. Such dual-shaft synchronous movement device employs multiple gears for transmitting force. However, as known by those who are skilled in this field, with the transmission gears, the gap between the shafts of the dual-shaft synchronous movement device can be hardly minified. Therefore, the entire transmission unit or structure will occupy a considerably large space. Especially, when the transmission unit is applied to a notebook or a miniaturized electronic device, the electronic device can hardly meet the requirement for lightweight and slimmed design. This is not what we expect.

The conventional rotary shaft structures and the relevant connection components thereof have some shortcomings in use and structural design that need to be overcome. It is therefore tried by the applicant to provide a dual-shaft synchronous movement device and an assembling method thereof to eliminate the shortcomings existing in the conventional rotary shaft structure so as to widen the application range and facilitate the assembling process of the rotary shaft structure.

The synchronous movement device applied to the dual-shaft system of the present invention has the following advantages:

1. The synchronous movement device of the present invention is mounted between the display module and the apparatus body module. When an operator 0°~180° rotates the display module, the apparatus body module is synchronously relatively 0°~180° rotated. Therefore, the total rotational angle of the display module and the apparatus body module is 360°. Accordingly, the operator can more quickly and conveniently operate the electronic apparatus in more operation modes (or application ranges). Also, the synchronous movement effect and operational stability of the synchronous movement device and the cooperative rotary shafts are enhanced.
2. The synchronous movement device or transmission mechanism of the present invention is free from any of the gaskets with through holes and recessed/raised locating sections and the frictional plates as well as the springs employed in the conventional rotary shaft structures. Therefore, the problems existing in the conventional technique that the structures are relatively complicated and it is hard to assemble the structures and the recessed/raised locating sections of the gaskets or frictional plates are likely to wear can be apparently improved.
3. The synchronous movement device of the present invention overcomes the problem of delay of kinetic energy transmission of the conventional wires or transmission belts. The synchronous movement device of the present invention also solves the problem of the conventional transmission mechanism that there is a gap between the wires and the rollers so that the wires will slip or untruly operate. The synchronous movement device of the present invention also solves the problem of the conventional transmission mechanism that the fixing structure for assembling the wires with the rollers is not ideal so that in force transmission, the load on the wires or the pulling force applied to the wires will increase to deteriorate the transmission effect.

4. The synchronous movement device or transmission mechanism of the present invention is free from any gear for transmitting force as in the conventional technique. Therefore, the gap between the shafts can be as minified as possible. Therefore, the space occupied by the entire transmission unit or structure is reduced. Accordingly, when the transmission unit is applied to an electronic device, the electronic device can meet the requirement for lightweight and slimmed design.

SUMMARY OF THE INVENTION

It is therefore a primary object of the present invention to provide a synchronous movement device applied to dual-shaft system including a first shaft and a second shaft. The synchronous movement device includes a driver disposed on the first shaft and a reactor disposed on the second shaft and a link unit connected between the driver and the reactor. In operation, the driver, the link unit and the reactor serve to transmit force to make the first and second shafts synchronously rotate.

In the above synchronous movement device applied to dual-shaft system, the link unit includes a first main body and a second main body movably assembled on the first and second shafts respectively. Each of the first and second main bodies has a main end and a subsidiary end. The main end of the first main body is in contact with the driver, while the subsidiary end of the first main body is in contact with a subsidiary driver. The main end of the second main body being in contact with the reactor, while the subsidiary end of the second main body being in contact with a subsidiary reactor disposed at the pivoted end of the second shaft and rotatable therewith.

When the first shaft drives the driver to rotate, the link unit is pushed to move along the first and second shafts. At this time, the subsidiary driver responds to the rotation of the first shaft to rotate and provide a space, permitting the link unit to move. When the link unit moves, the main end of the second main body pushes the reactor to rotate in a direction reverse to the moving direction of the driver. Accordingly, the second shaft and the subsidiary reactor are synchronously rotated.

In the above synchronous movement device applied to dual-shaft system, the driver, the subsidiary driver, the reactor and the subsidiary reactor are like a roller mechanism. Each of the driver, the subsidiary driver, the reactor and the subsidiary reactor has a slope side. The main ends and subsidiary ends of the first and second main bodies of the link unit have slope faces corresponding to the slope sides. The slope side (and the slope face) and a reference axis contain an angle of 30°~60°.

The angle is preferably 45' to facilitate the cooperation between the driver, the subsidiary driver, the reactor, the subsidiary reactor and the link unit (or the first and second main bodies).

The present invention can be best understood through the following description and accompanying drawings, wherein:

DETAILED DESCRIPTION OF THE PREFERRED EMBODIMENTS

Figure 1:
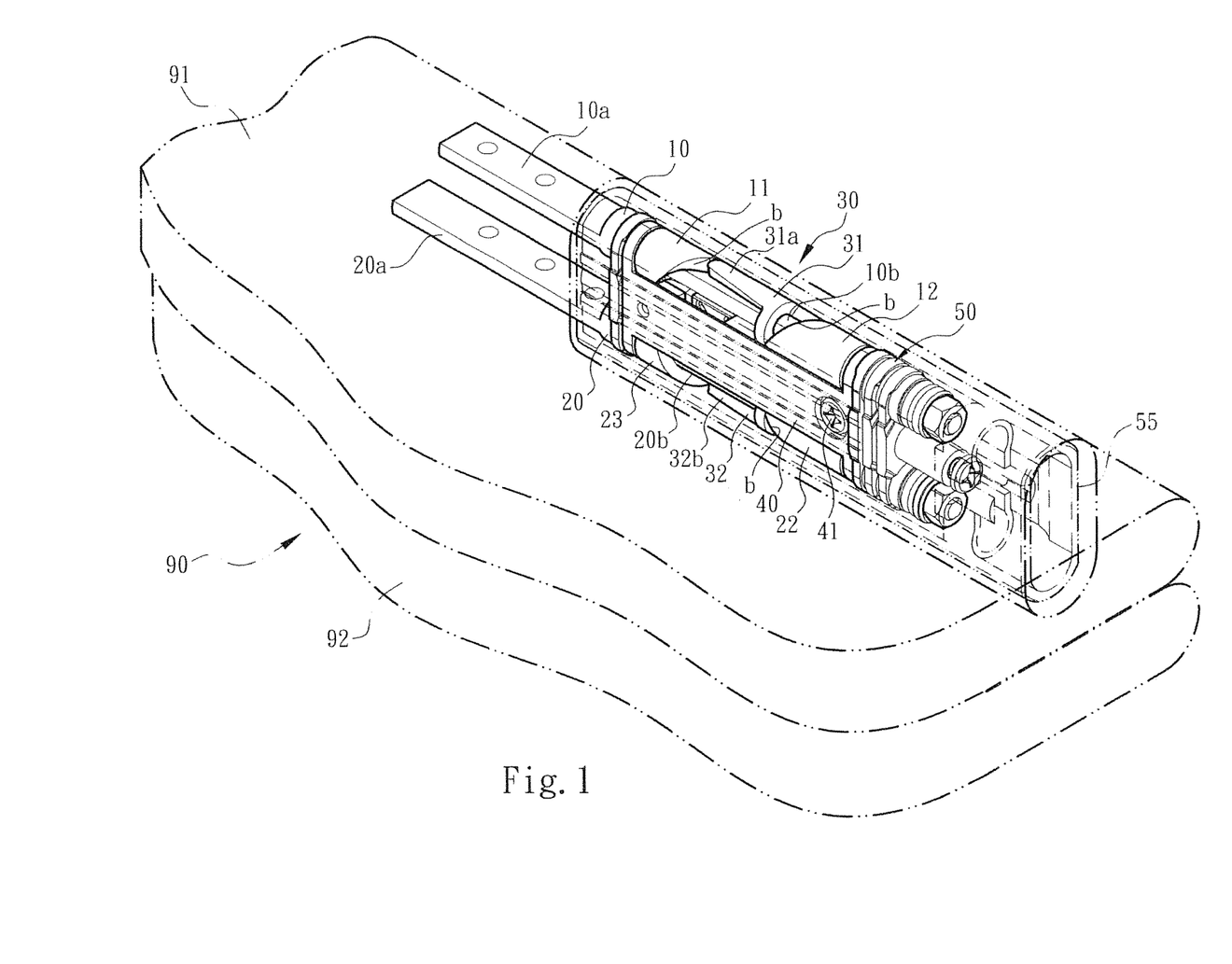
FIG. 1 is a perspective assembled view of the synchronous movement device of the present invention and the casing thereof, in which the phantom lines show that the display module is closed on the apparatus body module.
Figure 2:
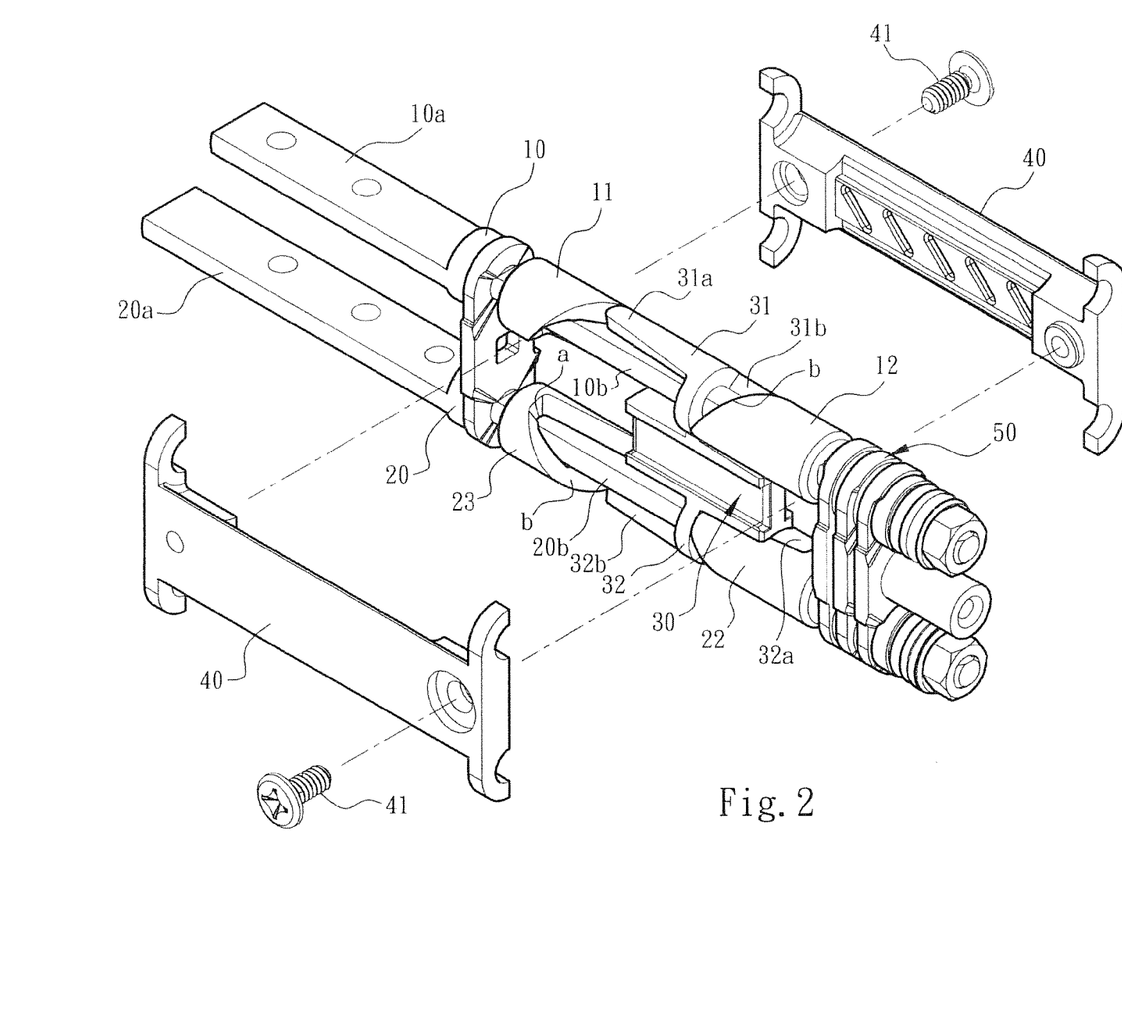
FIG. 2 is a perspective (front) view of the synchronous movement device of the present invention.
Figure 3:
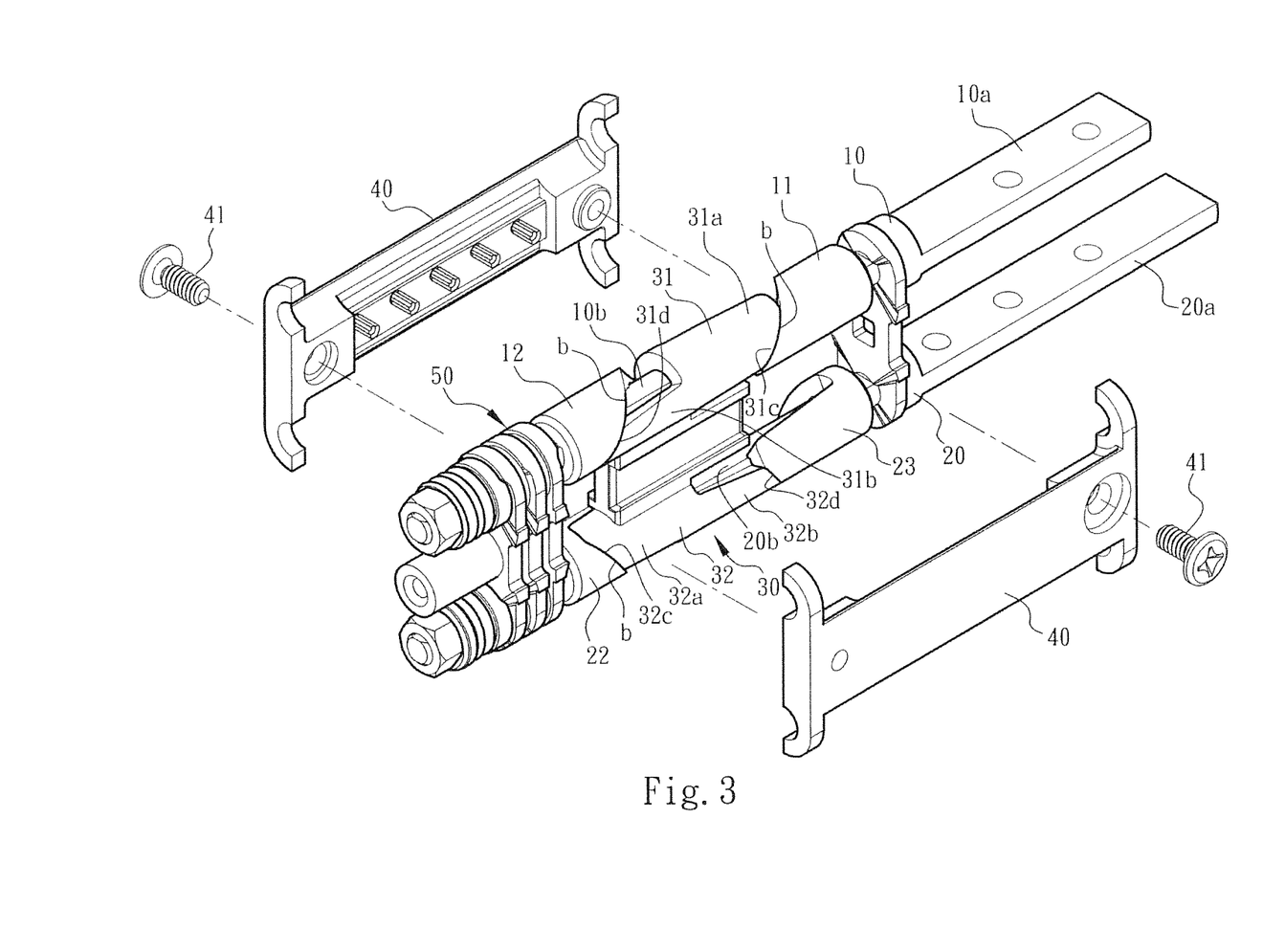
FIG. 3 is a perspective (rear) view of the synchronous movement device of the present invention.

Please refer to FIGS. 1, 2 and 3. The synchronous movement device applied to dual-shaft system of the present invention includes a first shaft 10 and a second shaft 20. The first and second shafts 10, 20 are assembled with each other and disposed in a casing 55. Each of the first and second shafts 10, 20 has a fixed end 10a, 20a and a pivoted end 10b, 20b. Through fixing seats (not shown), the fixed ends 10a, 20a of the first and second shafts 10, 20 are respectively fixed on a display module 91 and an apparatus body module 92 of an electronic apparatus 90 (such as a mobile phone or a computer).

Please refer to FIGS. 2 and 3 (or 4 and 5). The pivoted end 10b of the first shaft 10 is provided with a driver 11 rotatable with the first shaft 10. The pivoted end 20b of the second shaft 20 is provided with a reactor 22 synchronously rotatable with the second shaft 22. In addition, the pivoted ends 10b, 20b of the first and second shafts 10, 20 are provided with a link unit 30 connected with the driver 11 and the reactor 22. The driver 11, reactor 22 and the link unit 30 are assembled on the first and second shafts 10, 20 via a fixing assembly 50. When the first shaft 10 drives the driver 11 to rotate, the link unit 30 is pushed and displaced to forcedly rotate the reactor 22 in a direction reverse to the moving direction of the driver 11, whereby the first and second shafts 10, 20 are synchronously rotated.

In this embodiment, the link unit 30 includes a first main body 31 and a second main body 32 assembled on the first and second shafts 10, 20 respectively. The first and second main bodies 31, 32 are integrally formed or connected with each other and (axially) movable along the first and second shafts 10, 20.

Figure 4:
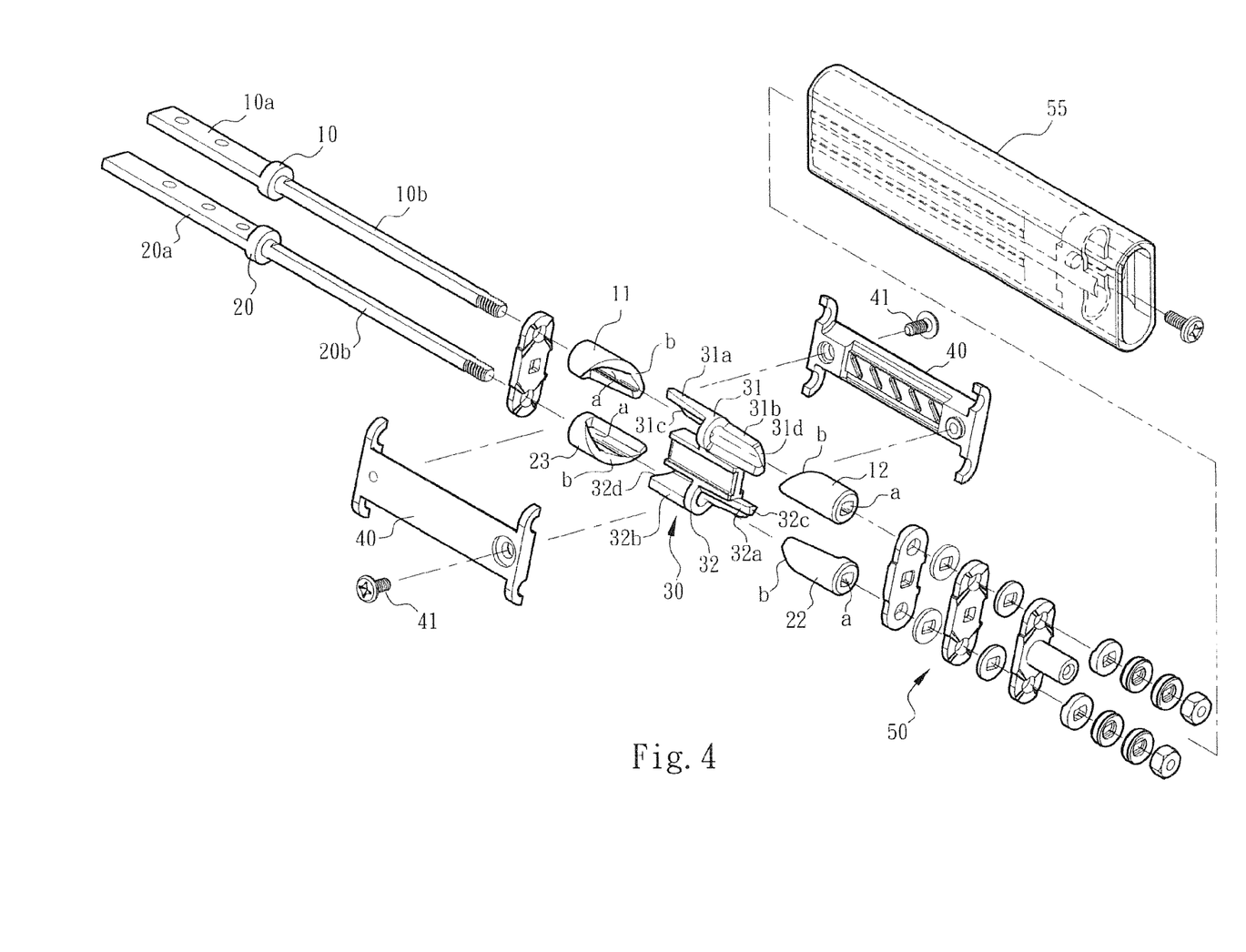
FIG. 4 is a perspective exploded view of the synchronous movement device of the present invention, showing the positional relationship between the first and second shafts, the driver, the subsidiary driver, the link unit and the reactor and the subsidiary reactor.
Figure 5:
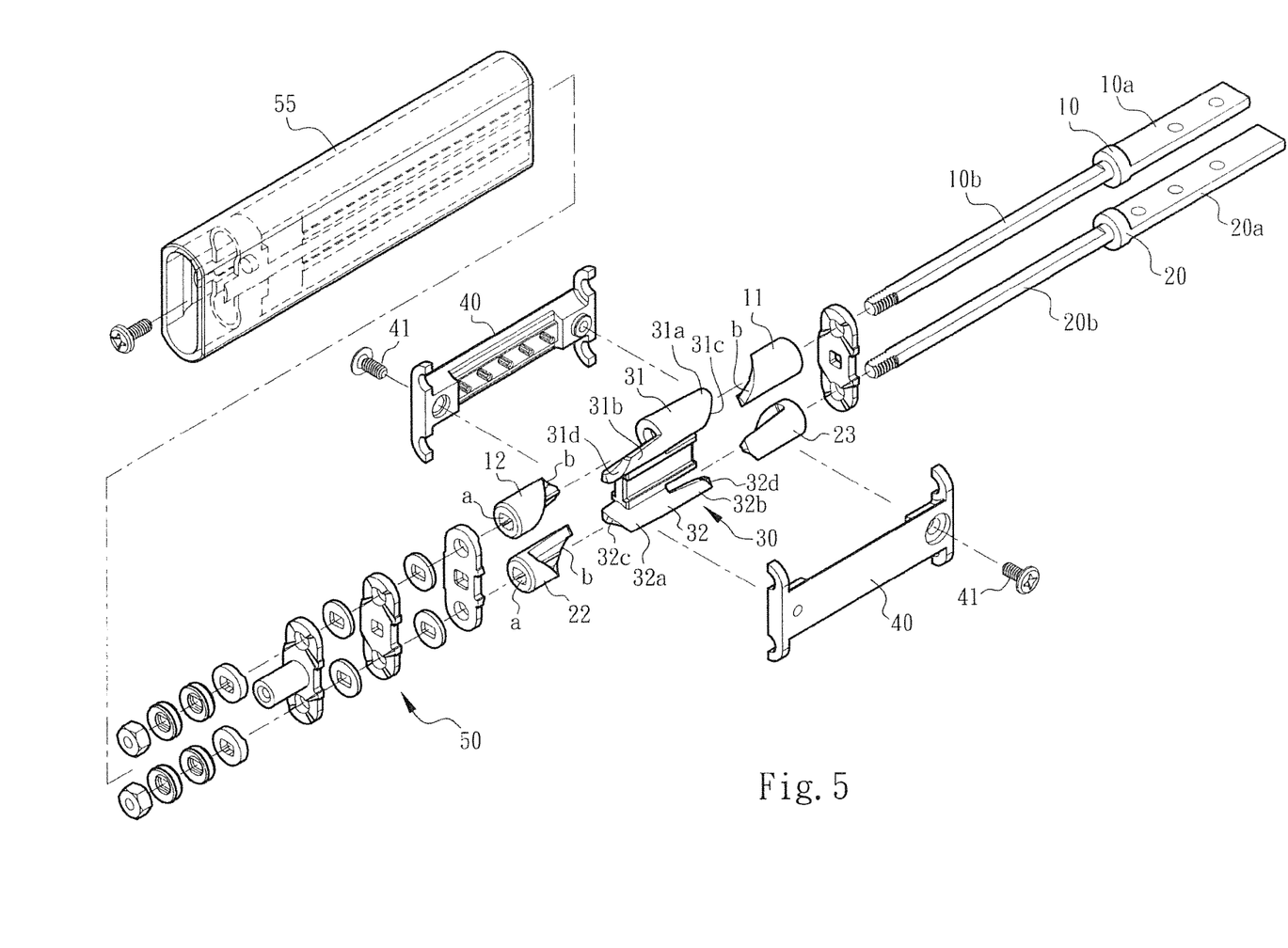
FIG. 5 is a perspective exploded view of the synchronous movement device of the present invention seen from another angle, showing the positional relationship between the first and second shafts, the driver, the subsidiary driver, the link unit and the reactor and the subsidiary reactor.

Referring to FIGS. 4 and 5, the first and second main bodies 31, 32 are respectively defined with a main end 31a, 32a and a subsidiary end 31b, 32b. The main end 31a of the first main body 31 is in contact with the driver 11, while the subsidiary end 31b of the first main body 31 is in contact with a subsidiary driver 12 disposed on the pivoted end 10b of the first shaft 10. The main end 32a of the second main body 32 is in contact with the reactor 22, while the subsidiary end 32b of the second main body 32 is in contact with a subsidiary reactor 23 disposed on the pivoted end 20b of the second shaft 20.

According to the above arrangement, when the first shaft 10 drives the driver 11 to rotate, the link unit 30 is pushed to move along the first and second shafts 10, 20. At this time, the subsidiary driver 12 responds to the rotation of the first shaft 10 to rotate and provide a space, permitting the link unit 30 to move. When the link unit 30 moves, the main end 32a of the second main body 32 pushes the reactor 22 to rotate in a direction reverse to the moving direction of the driver 11 (or the subsidiary driver 12). Accordingly, the second shaft 20 and the subsidiary reactor 23 are synchronously rotated.

To speak more specifically, the driver 11, the subsidiary driver 12, the reactor 22 and the subsidiary reactor 23 are like a roller mechanism. Each of these components has a shaft hole a, whereby the driver 11, the subsidiary driver 12, the reactor 22 and the subsidiary reactor 23 can be respectively fitted on the pivoted ends 10b, 20b of the first and second shafts 10, 20. As shown in the drawings, the shaft hole a has a cross-sectional configuration identical to that of the pivoted ends 10b, 20b of the first and second shafts. For example, in the drawings, the pivoted ends 10b, 20b of the first and second shafts have a rectangular cross section and the shaft hole a has an identical rectangular cross section, whereby the pivoted ends 10b, 20b of the first and second shafts can fitted in the shaft hole a. In this case, the driver 11 and the subsidiary driver 12 are rotatable with the first shaft 10, while the reactor 22 and the subsidiary reactor 23 are rotatable with the second shaft 20.

In this embodiment, each of the driver 11, the subsidiary driver 12, the reactor 22 and the subsidiary reactor 23 has a slope side b and the main ends 31a, 32a and subsidiary ends 31b, 32b of the first and second main bodies 31, 32 of the link unit have slope faces 31c, 32c, 31d, 32d corresponding to and interactive with the slope side b. The slope side b (and the slope faces 31c, 32c, 31d, 32d) and a reference axis (such as the axis of the first shaft 10 or the second shaft 20) contain an angle of 30°~60°.

In this embodiment, the angle is preferably 45° to facilitate the cooperation between the driver 11, the subsidiary driver 12, the reactor 22, the subsidiary reactor 23 and the link unit 30 (or the first and second main bodies 31, 32).

It should be noted that with the axis of the first shaft 10 or the second shaft 20 as the reference standard, the slope side b of the driver 11 is inclined in a direction identical to the inclination direction of the slope face 31c of the main end of the first main body 31, but reverse to the inclination direction of the slope side b of the reactor 22 and the inclination direction of the slope face 32c of the main end of the second main body 32. The slope side b of the subsidiary driver 12 is inclined in a direction identical to the inclination direction of the slope face 31d of the subsidiary end of the first main body 31, but reverse to the inclination direction of the slope side b of the subsidiary reactor 23 and the inclination direction of the slope face 32d of the subsidiary end of the second main body 32.

Please refer to FIGS. 1, 2 and 3, which show that the display module 91 is closed onto the apparatus body module 92 with the angle contained therebetween 0°. Please refer to FIGS. 6 and 7, when an operator opens the display module 91 to make the first shaft 10 drive the driver 11 (or the subsidiary driver 12) to 90° rotate, the slope side b of the driver 11 will push the link unit 30 (or the main end 31a of the first main body 31) to move leftward according to the drawings. At the same time, the subsidiary driver 12 responds to the rotation of the first shaft 10 to rotate, whereby the slope face 31d of the subsidiary end 31b of the first main body gradually moves to mate with the slope side b of the subsidiary driver 12. In other words, the subsidiary driver 12 cooperatively rotates to permit the link unit 30 to move along the first shaft.

Figure 6:
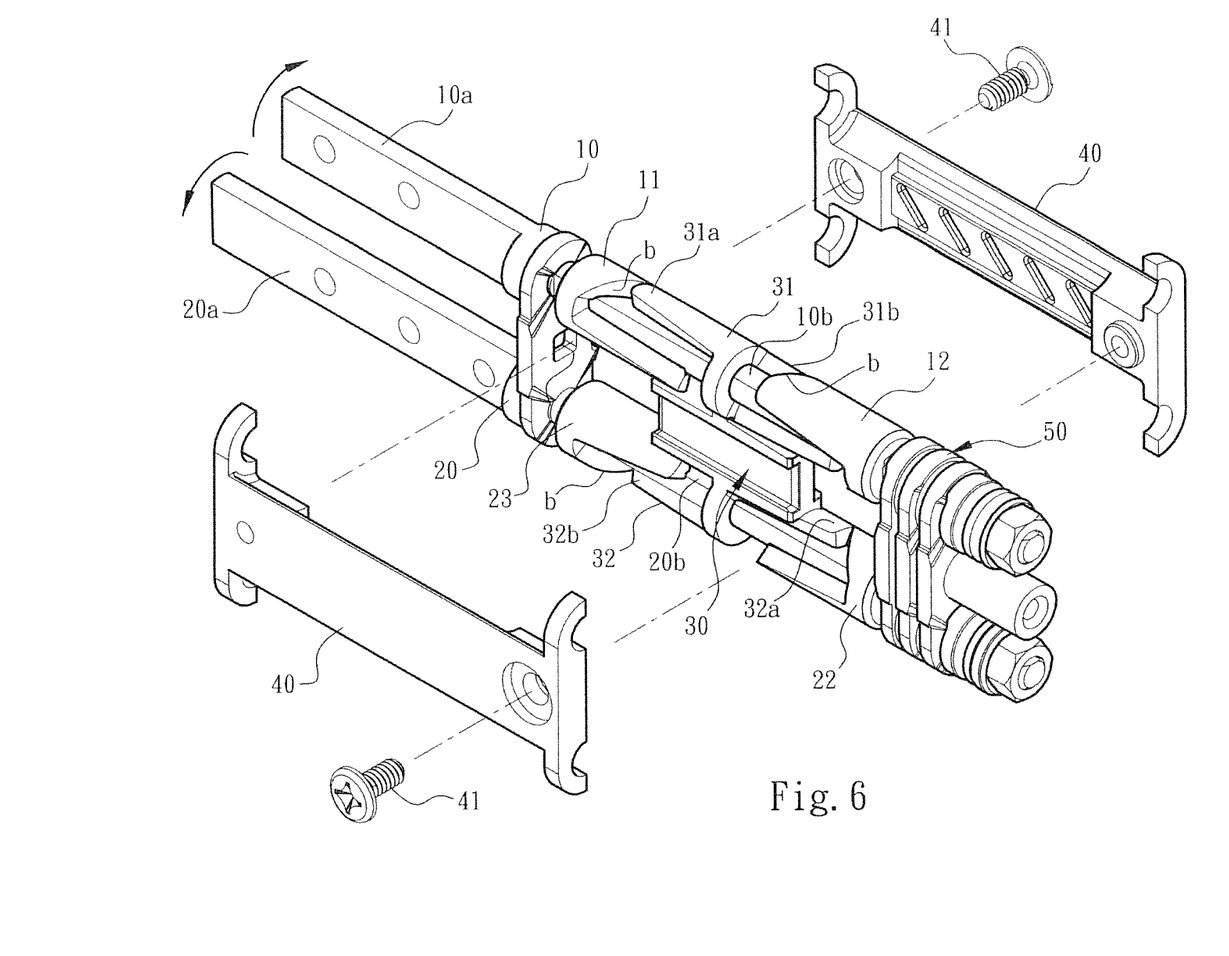
FIG. 6 is a perspective view of the synchronous movement device of the present invention, showing that the first shaft, the driver and the subsidiary driver are 90° rotated to synchronously move the link unit, the reactor, the subsidiary reactor and the second shaft.
Figure 7:
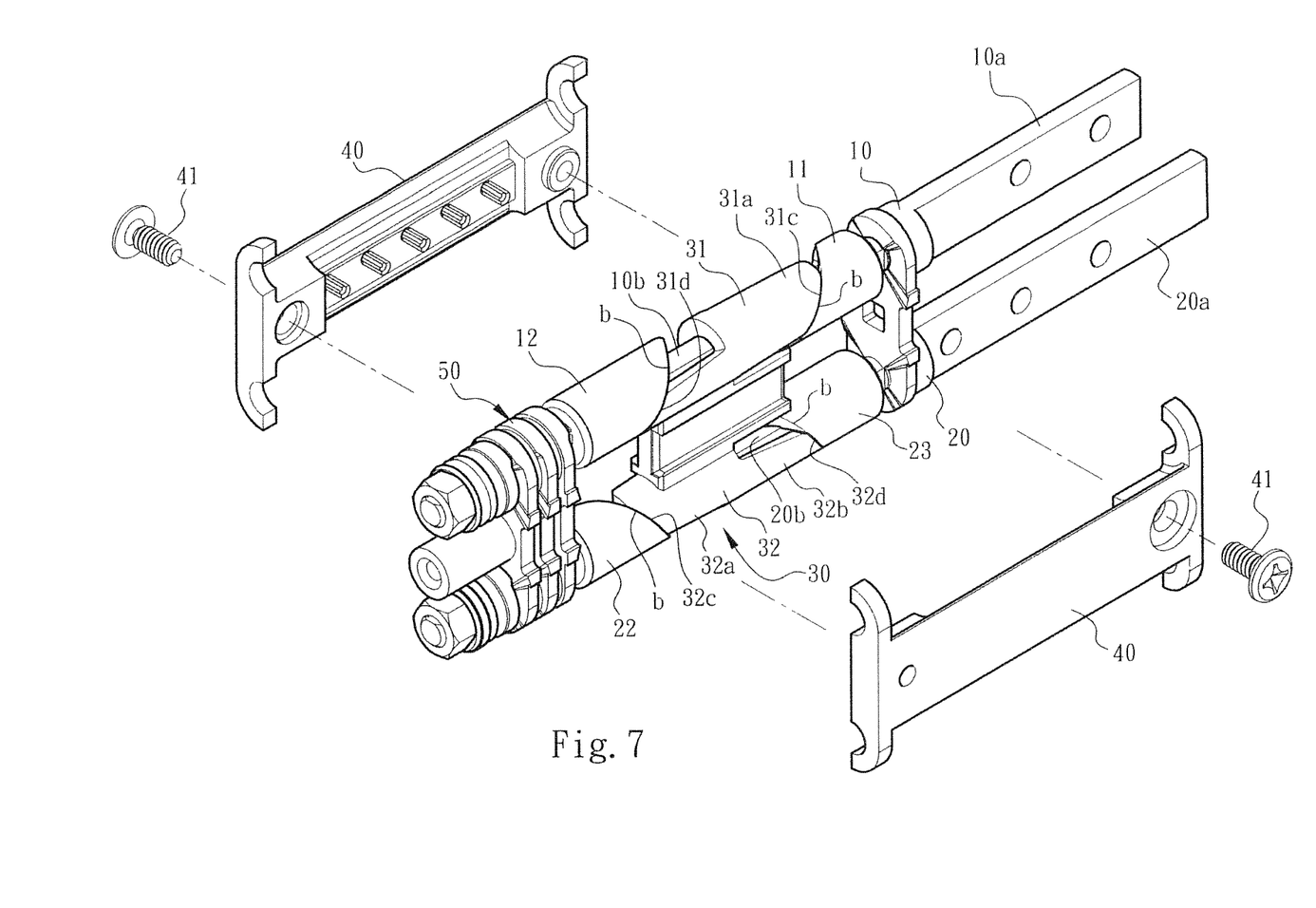
FIG. 7 is a perspective view of the synchronous movement device of the present invention according to FIG. 6, seen from another angle.

When the link unit 30 is moved, the slope face 32c of the main end 32a of the second main body pushes the slope side b of the reactor 22 to forcedly rotate the reactor 22 in a direction reverse to the moving direction of the driver 11 (or the subsidiary driver 12), whereby the second shaft 20 and the subsidiary reactor 23 are synchronously rotated.

Therefore, as shown in FIGS. 6 and 7, when the operator opens the display module 91 to make the first shaft 10 rotate to a 90° position, the driver 11, the subsidiary driver 12, the link unit 30, the reactor 22 and the subsidiary reactor 23 cooperate with each other to transmit the force and make the second shaft 20 as well as the apparatus body module 92 synchronously clockwise rotate to a 90 position. That is, the display module 91 and the apparatus body module 92 are totally relatively rotated by 180°.

Figure 8:
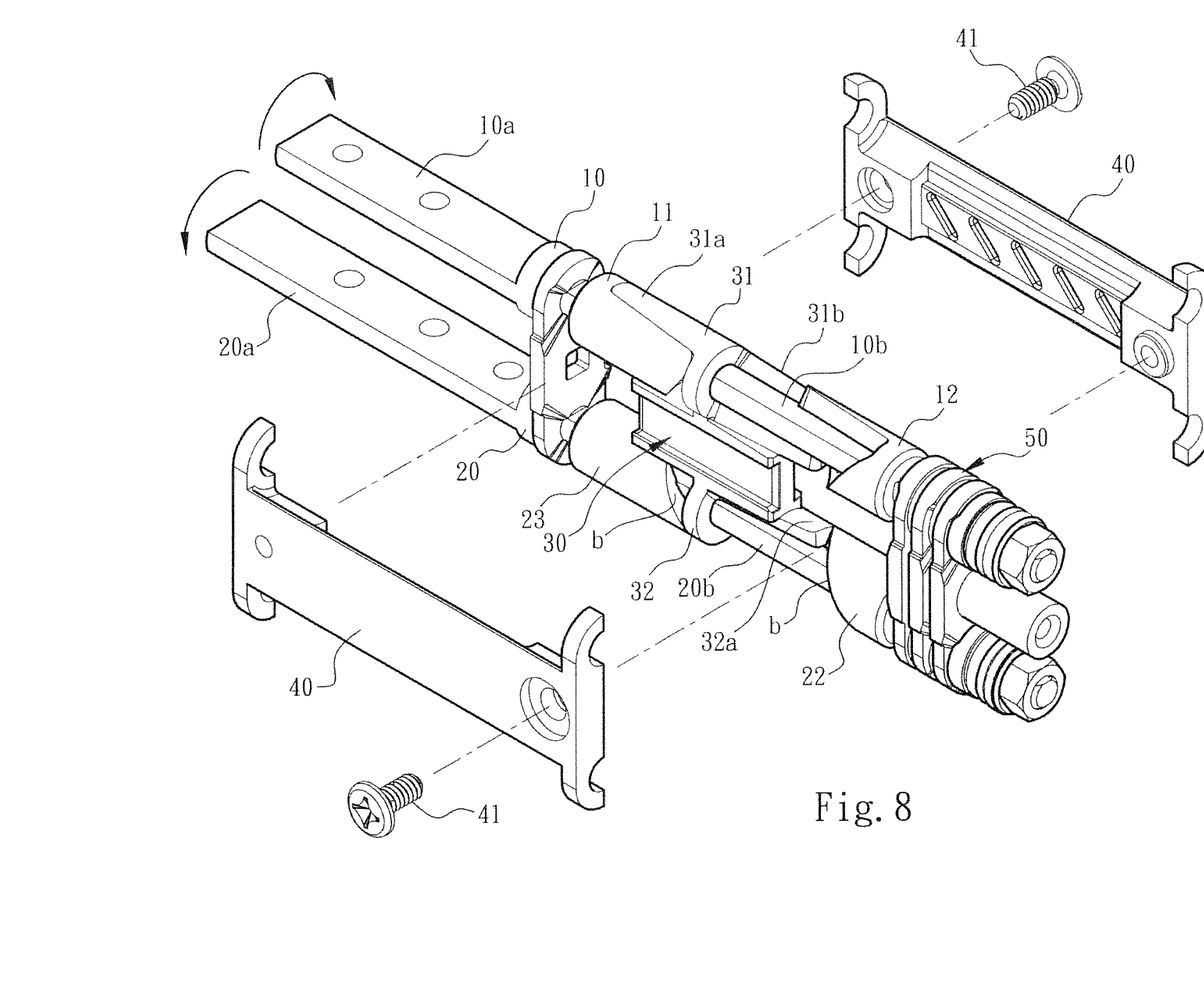
FIG. 8 is another perspective view of the synchronous movement device of the present invention, showing that the first shaft, the driver and the subsidiary driver are 180° rotated to synchronously move the link unit, the reactor, the subsidiary reactor and the second shaft.
Figure 9:
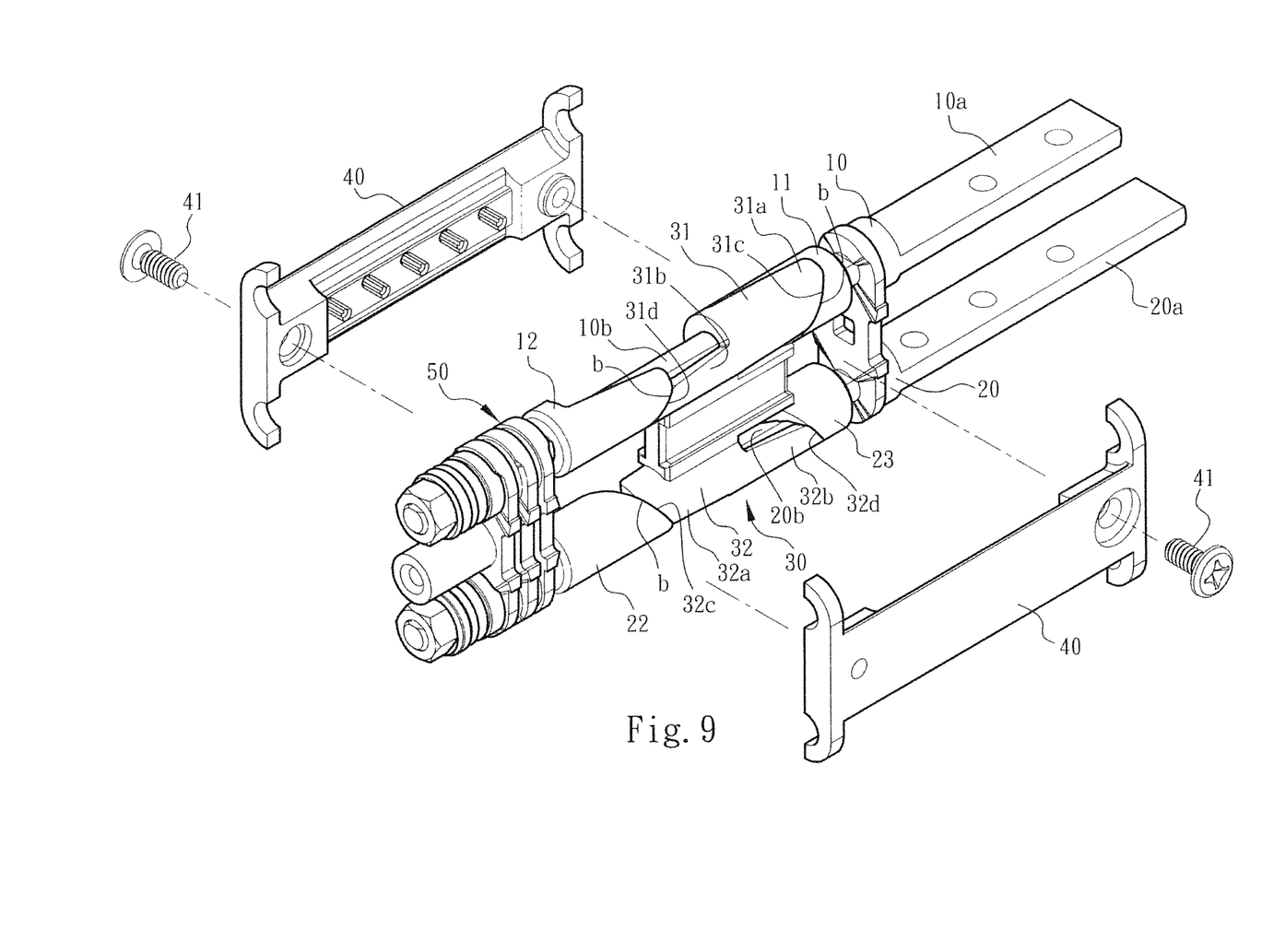
FIG. 9 is a perspective view of the synchronous movement device of the present invention according to FIG. 8, seen from another angle.

As shown in FIGS. 8 and 9, when the operator opens and rotates the display module 91 to a 180° position, the apparatus body module 92 is synchronously clockwise rotated to a 180° position. That is, the display module 91 and the apparatus body module 92 are totally relatively rotated by 360°.

That is, by means of the synchronous movement device, a user can operate and rotate the display module 91 by a certain angle or range to achieve a travel double the rotational angle or range. Accordingly, the user can more quickly and conveniently operate the electronic apparatus.

In a preferred embodiment, the synchronous movement device of the present invention further includes a frame set 40. By means of fixing members 41, the frame set 40 is integrally locked to enclose and receive the driver 11 (and/or the subsidiary driver 12), the link unit 30 and the reactor 22 (and/or the subsidiary reactor 23). In this case, the driver 11 (and/or the subsidiary driver 12), the link unit 30 and the reactor 22 (and/or the subsidiary reactor 23) can more stably and truly operate.

It should be noted that during the force transmission process of the synchronous movement device of the present invention, the driver 11 (and/or the subsidiary driver 12), the link unit 30 and the reactor 22 (and/or the subsidiary reactor 23) are cooperatively assembled with each other to minimize the possibility of torque change or slippage that often happens in the conventional device. In this case, the first and second shafts 10, 20 can be smoothly rotated. Moreover, once the rotational force disappears, the rotors stop rotating to be located in a desired position.

In comparison with the conventional device, the synchronous movement device applied to the dual-shaft system of the present invention has the following advantages:

1. The rotary shafts (the first and second shafts 10, 20) are the relevant components (such as the driver 11 (and/or the subsidiary driver 12), the link unit 30 and the reactor 22 (and/or the subsidiary reactor 23)) together form a synchronous movement mechanism. This structure is apparently different from the conventional device, which employs multiple gears or rollers and drive wires (or transmission belts) for transmitting force and rotating the rotary shafts or multiple gaskets, frictional plates and cooperative springs for storing energy and releasing the energy.
2. The driver 11 (and/or the subsidiary driver 12) and the reactor 22 (and/or the subsidiary reactor 23) and the cooperative link unit 30 together form the synchronous movement device. The synchronous movement device is mounted between the display module 91 and the apparatus body module 92. When an operator 0°~180° rotates the display module 91, the apparatus body module will synchronously relatively rotate by 0°~180°. Accordingly, the total rotational angle of the display module 91 and the apparatus body module 92 is 360°. That is, by means of the synchronous movement device, a user can operate and rotate the display module 91 by a certain angle or range to achieve a travel double the rotational angle or range. Accordingly, the user can more quickly and conveniently operate the electronic apparatus in more operation modes (or application ranges).

3. The driver 11 (and/or the subsidiary driver 12) and the reactor 22 (and/or the subsidiary reactor 23) and the cooperative link unit 30 together form a synchronous transmission structure different from the conventional transmission mechanism and relevant cooperative structures. The synchronous movement device of the present invention overcomes the problem of delay of kinetic energy transmission of the conventional wires or transmission belts. The synchronous movement device of the present invention also solves the problem of the conventional transmission mechanism that there is a gap between the wires and the rollers so that the wires will slip or untruly operate. The synchronous movement device of the present invention also solves the problem of the conventional transmission mechanism that the fixing structure for assembling the wires with the rollers is not ideal so that in force transmission, the load on the wires or the pulling force applied to the wires will increase to deteriorate the transmission effect.

4. The driver 11 (and/or the subsidiary driver 12) and the reactor 22 (and/or the subsidiary reactor 23) and the cooperative link unit 30 together form a synchronous transmission structure advantageous over the conventional transmission mechanism in that the synchronous transmission structure is easier to manufacture and assemble. Moreover, the synchronous movement device or transmission mechanism of the present invention is free from any gear for transmitting force as in the conventional technique. Therefore, the gap between the shafts can be as minified as possible. Therefore, the space occupied by the entire transmission unit or structure is reduced. Accordingly, when the transmission unit is applied to an electronic device, the electronic device can meet the requirement for lightweight and slimmed design.

In conclusion, the synchronous movement device applied to the dual-shaft system of the present invention is different from and advantageous over the conventional device.

The above embodiments are only used to illustrate the present invention, not intended to limit the scope thereof. Many modifications of the above embodiments can be made without departing from the spirit of the present invention.

What is claimed is:

1. A synchronous movement device applied to dual-shaft system, comprising:
   a first shaft having a fixed end and a pivoted end;
   a driver disposed at the pivoted end of the first shaft;
   a second shaft having a fixed end and a pivoted end;
   a reactor disposed at the pivoted end of the second shaft; and
   a link unit disposed on the first and second shafts and connected with the driver and the reactor, the driver being rotatable with the first shaft to push the link unit to move along the first and second shafts so as to make the reactor rotate in a direction reverse to a moving direction of the driver, whereby the first and second shafts are synchronously rotated;
   wherein the link unit includes a first main body and a second main body assembled on the first and second shafts respectively, the first and second main bodies being connected with each other; and
   each of the first and second main bodies has a main end and a subsidiary end, the main end of the first main body being in contact with the driver, while the subsidiary end of the first main body being in contact with a subsidiary driver disposed at the pivoted end of the first shaft and rotatable therewith, the main end of the second main body being in contact with the reactor, while the subsidiary end of the second main body being in contact with a subsidiary reactor disposed at the pivoted end of the second shaft and rotatable therewith.

2. The synchronous movement device applied to dual-shaft system as claimed in claim 1, wherein the first and second main bodies are integrally formed.

3. The synchronous movement device applied to dual-shaft system as claimed in claim 1, wherein each of the driver, the subsidiary driver, the reactor and the subsidiary reactor having a shaft hole, whereby the driver, the subsidiary driver, the reactor and the subsidiary reactor are respectively fitted on the pivoted ends of the first and second shafts, each of the driver, the subsidiary driver, the reactor and the subsidiary reactor having a slope side, the main ends and subsidiary ends of the first and second main bodies of the link unit having slope faces corresponding to the slope sides.

4. The synchronous movement device applied to dual-shaft system as claimed in claim 3, wherein the slope side and the slope face and a reference axis contain an angle of 30°~60°, the reference axis being an axis of the first shaft or an axis of the second shaft.

5. The synchronous movement device applied to dual-shaft system as claimed in claim 4, wherein the angle is 45°.

6. The synchronous movement device applied to dual-shaft system as claimed in claim 3, wherein the slope side of the driver is inclined in a direction identical to an inclination direction of the slope face of the main end of the first main body, but reverse to an inclination direction of the slope side of the reactor and an inclination direction of the slope face of the main end of the second main body.

7. The synchronous movement device applied to dual-shaft system as claimed in claim 4, wherein the slope side of the driver is inclined in a direction identical to an inclination direction of the slope face of the main end of the first main body, but reverse to an inclination direction of the slope side of the reactor and an inclination direction of the slope face of the main end of the second main body.

8. The synchronous movement device applied to dual-shaft system as claimed in claim 3, wherein the slope side of the subsidiary driver is inclined in a direction identical to an inclination direction of the slope face of the subsidiary end of the first main body, but reverse to an inclination direction of the slope side of the subsidiary reactor and an inclination direction of the slope face of the subsidiary end of the second main body.

9. The synchronous movement device applied to dual-shaft system as claimed in claim 4, wherein the slope side of the subsidiary driver is inclined in a direction identical to an inclination direction of the slope face of the subsidiary end of the first main body, but reverse to an inclination direction of the slope side of the subsidiary reactor and an inclination direction of the slope face of the subsidiary end of the second main body.

10. The synchronous movement device applied to dual-shaft system as claimed in claim 3, wherein the shaft hole has a cross-sectional configuration identical to that of the pivoted ends of the first and second shafts.

11. The synchronous movement device applied to dual-shaft system as claimed in claim 10, wherein the pivoted ends of the first and second shafts have a rectangular cross section and the shaft hole has an identical rectangular cross section.

12. The synchronous movement device applied to dual-shaft system as claimed in claim 1, further comprising a frame set, by means of fixing members, the frame set being integrally locked to enclose and receive the driver, the subsidiary driver, the link unit and the reactor and the subsidiary reactor.

13. The synchronous movement device applied to dual-shaft system as claimed in claim 1, wherein the first and second shafts are assembled with each other and disposed in a casing.

14. The synchronous movement device applied to dual-shaft system as claimed in claim 1, wherein the fixed ends of the first and second shafts are respectively fixed on a display module and an apparatus body module of an electronic apparatus by means of fixing seats.

15. The synchronous movement device applied to dual-shaft system as claimed in claim 1, wherein when the first shaft is 0°~180° rotated, the second shaft is synchronously 0°~180° rotated in a reverse direction.

16. The synchronous movement device applied to dual-shaft system as claimed in claim 14, wherein when the first shaft is 0°~180° rotated, the second shaft is synchronously 0°~180° rotated in a reverse direction.

* * * * *